(12) United States Patent
Kaneko et al.

(10) Patent No.: US 6,995,819 B2
(45) Date of Patent: Feb. 7, 2006

(54) SEMI-TRANSMISSIVE LIQUID CRYSTAL DISPLAY DEVICE

(75) Inventors: Wakahiko Kaneko, Akita (JP); Hidenori Kusanagi, Akita (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/309,016

(22) Filed: Dec. 4, 2002

(65) Prior Publication Data

US 2003/0107691 A1   Jun. 12, 2003

(30) Foreign Application Priority Data

Dec. 6, 2001 (JP) .............................. 2001-373379

(51) Int. Cl.
*G02F 1/1335* (2006.01)

(52) U.S. Cl. .................... 349/112; 349/64; 349/113; 349/114

(58) Field of Classification Search ................ 349/64, 349/65, 68, 95, 112–115
See application file for complete search history.

(56) References Cited

U.S. PATENT DOCUMENTS

| | | | | |
|---|---|---|---|---|
| 5,767,935 A * | 6/1998 | Ueda et al. | | 349/112 |
| 5,812,225 A | 9/1998 | de Lauzun et al. | | |
| 5,995,180 A * | 11/1999 | Moriwaki et al. | | 349/96 |
| 6,011,605 A * | 1/2000 | Mizuno et al. | | 349/113 |
| 6,239,852 B1 * | 5/2001 | Oono et al. | | 349/112 |
| 6,424,395 B1 * | 7/2002 | Sato et al. | | 349/112 |
| 6,493,051 B2 * | 12/2002 | Ha et al. | | 349/113 |
| 6,552,767 B1 * | 4/2003 | Kaneko | | 349/119 |
| 2002/0012085 A1 * | 1/2002 | Honda et al. | | 349/112 |
| 2002/0145689 A1 * | 10/2002 | Kaneko | | 349/114 |

FOREIGN PATENT DOCUMENTS

| | | |
|---|---|---|
| JP | 10-062777 | 3/1998 |
| JP | 11-326895 | 11/1999 |
| JP | 2000-075283 | 3/2000 |
| JP | 2000-305099 | 11/2000 |
| JP | 2001-133606 | 5/2001 |
| TW | 451098 | 8/2001 |

OTHER PUBLICATIONS

Taiwanese Office Action dated Apr. 27, 2004, with partial English translation.
Korean Office Action dated Feb. 15, 2005 with a partial English translation.

* cited by examiner

*Primary Examiner*—Robert H. Kim
*Assistant Examiner*—Michael H. Caley
(74) *Attorney, Agent, or Firm*—McGinn IP Law Group, PLLC

(57) ABSTRACT

A semi-transmissive liquid crystal display device of the present invention is so configured that a diffraction film and a light scattering layer are provided on a color-filter substrate on the side thereof on which a display screen resides, and the light scattering layer is disposed nearer a liquid crystal layer than the diffraction film. The semi-transmissive liquid crystal display device thus configured has improved viewing-angle characteristics in the transmissive mode.

10 Claims, 6 Drawing Sheets

SEMI-TRANSMISSIVE LIQUID CRYSTAL DISPLAY DEVICE

BACKGROUND OF THE INVENTION

1. Field of the Invention

The present invention relates to a semi-transmissive liquid crystal display device and more particularly to the configuration of optical control layers provided on the front side of a display panel.

2. Description of the Related Art

In recent years, a semi-transmissive liquid crystal display device has been used for applications, such as a PDA (personal digital assistant), a portable telephone and a portable electronic device, in which suppressed power consumption and improved display performance are required. For such applications, the semi-transmissive liquid crystal display device is preferred which utilizes external light such as sunlight or illumination light at daytime or under bright indoor environment and further utilizes backlight at nighttime or under dark indoor environment.

However, when the semi-transmissive liquid crystal display device is used mainly in a transmissive mode using backlight at nighttime, the device occasionally causes a phenomenon in which the viewing angle characteristics of the device deteriorates depending on the viewing angle in relation to a display screen. In addition, when the semi-transmissive liquid crystal display device is used mainly in a reflective mode using sunlight at daytime, the device causes a phenomenon in which parallel rays of sunlight incident on the liquid crystal display device are diffracted within the device to produce rainbow-colored and stripe-shaped light or radial light. In order to prevent those phenomena, the surface of display device is, in some cases, processed to convert incident light to scattered light. The conversion of incident light is generally performed by forming an anti-glare (AG) layer on the surface of the display device. However, the surface of display device thus processed causes sunlight to be scattered backward off the display device (hereinafter, referred to as backward scattering), i.e., scattered toward a viewer, resulting in the phenomenon in which the entire screen cannot be viewed depending on the viewing angle because of white representation on the entire screen.

SUMMARY OF THE INVENTION

Accordingly, an object of the present invention is to provide a liquid crystal display device capable of exhibiting excellent viewing-angle characteristics and suppressing the degree to which sunlight is scattered backward off the display screen of the device.

According to the present invention, there is provided a semi-transmissive liquid crystal display device includes a liquid crystal panel having a plurality of pixels, each of the pixels being divided into a transmissive region and a reflective region; a backlight member disposed behind the liquid crystal panel; a diffraction film disposed on a front side of the liquid crystal panel so as to diffract a transmissive light from the backlight member through the transmissive region; and a scattering layer disposed between the diffraction film and the liquid crystal panel so as to scatter an external light entering the reflective region through the diffraction film.

The semi-transmissive liquid crystal display device thus configured has the following preferable applications.

According to the first aspect of the liquid crystal display device of the invention, the device further includes a polarizer disposed between the diffraction film and the scattering layer.

According to the second aspect of the liquid crystal display device of the invention, the diffraction film serves as a Bragg grating.

According to the third aspect of the liquid crystal display device of the invention, the diffraction film diffracts the light from the backlight member toward upper region of the liquid crystal panel.

According to the fourth aspect of the liquid crystal display device of the invention, in the third aspect, the diffraction film is formed such that two layers having refractive indexes different from each other are alternately laminated at an angle inclined in relation to the horizontal direction and the two layers extend in left/right directions with respect to a display plane of the liquid crystal panel.

According to the fifth aspect of the liquid crystal display device of the invention, the light scattering layer is formed by dispersing fine particles selected from the group consisting of a plurality of fine circular particles and a plurality of fine polyhedral particles into a transparent resin as a matrix.

According to the sixth aspect of the liquid crystal display device of the invention, the scattering layer allows the external light to transmit therethrough exhibiting a transmittance not less than 80%.

According to the seventh aspect of the liquid crystal display device of the invention, the liquid crystal panel includes a liquid crystal layer sandwiched between a first substrate provided with a color layer and a second substrate provided with a plurality of pixel electrodes, and is constructed such that the second substrate is located on a side of the backlight member and each of the pixel electrodes comprises a transparent electrode for the transimissive region and a reflective electrode for the reflective region.

According to the eighth aspect of the liquid crystal display device of the invention, the seventh aspect of the device further comprises a polarizer disposed between the diffraction film and the scattering layer in which the diffraction film diffracts the light from the backlight member toward upper region of the liquid crystal panel. According to the ninth aspect of the liquid crystal display device of the invention, in the seventh aspect of the device, the first substrate has a ¼λ plate 21, a light scattering layer, a ½λ plate, the polarizer, a ¼λ plate and the diffraction film in order provided on a surface thereof opposite the liquid crystal layer, and the second substrate has a ¼λ plate, a ½λ plate and a polarizer in order provided on a surface thereof opposite the liquid crystal layer.

DETAILED DESCRIPTION OF THE PREFERRED EMBODIMENTS

Figure 1A:
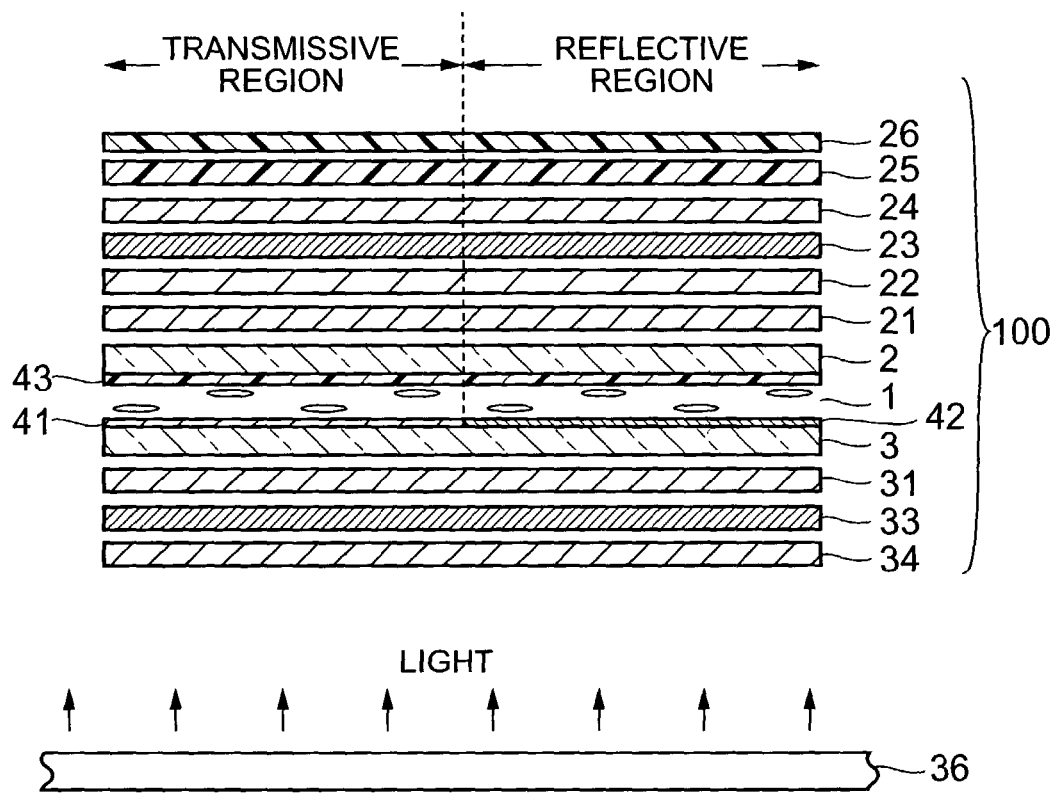
FIG. 1A is a schematic cross-sectional view of a pixel of the semi-transmissive liquid crystal display device of an embodiment of the present invention.
Figure 1B:
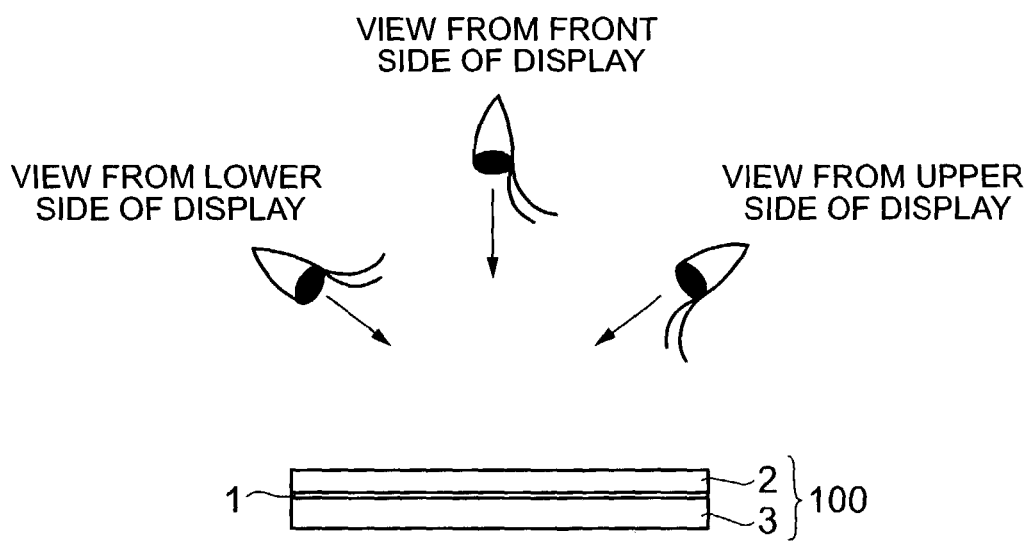
FIG. 1B is a schematic view showing the positional relationship between an eye of a viewer and the semi-transmissive liquid crystal display device.

An embodiment of a semi-transmissive liquid crystal display device according to the present invention will be explained below with reference to the accompanying drawings. FIG. 1A is a schematic cross-sectional view of one pixel of the semi-transmissive liquid crystal display device of the present invention. Specifically, FIG. 1A is an enlarged view of multiple optical control layers provided on surfaces of individual substrates on sides thereof opposite a liquid crystal layer. In this case, a transmissive region is shown in the left half of the figure and a reflective region is shown in the right half. FIG. 1B is a schematic view showing the positional relationship between a viewer and the semi-transmissive liquid crystal display device, and the schematic view is comprised only of the liquid crystal layer and the individual substrates interposing the liquid crystal layer therebetween for simplicity.

Referring to FIG. 1A, a color-filter substrate 2 (hereinafter, referred to as a "CF substrate") and a thin-film transistor substrate 3 (hereinafter, referred to as a "TFT substrate") are disposed sandwiching a liquid crystal layer 1. In this case, provided in the transmissive region of the TFT substrate a transparent electrode 41 facing the liquid crystal layer 1 and provided in the reflective region thereof a reflective electrode 42 facing the liquid crystal layer 1. On the other hand, provided over the transmissive and reflective regions of the CF substrate 2 a color layer 43 facing the liquid crystal layer 1. In addition, disposed on a surface of the CF substrate 2 opposite the liquid crystal layer 1 are a ¼λ plate 21, a light scattering layer 22, a ½λ plate 23, a polarizer 24, a ¼λ plate 25, a diffraction film 26 such as a diffraction grating film and a surface treatment layer (not shown) such as an anti-reflection layer, thereby constituting a liquid crystal cell 100 corresponding to one pixel. Furthermore, if desired, the diffraction film 26 may be used together with, a polyethylene terephthalate (referred to as "PET") film provided thereon and having antiscratch properties. The diffraction film 26 preferably serves as a Bragg grating.

As for the TFT substrate 3, disposed on a surface of the TFT substrate 3 opposite the liquid crystal layer 1 are a ¼λ plate 31, a ½λ plate 33 and a polarizer 34 in order, thereby constituting the liquid crystal cell 100 corresponding to one pixel. In addition, a light source 36 as a backlight member is disposed behind the polarizer 34.

How the good viewing-angle characteristics are obtained in the inventive semi-transmissive liquid crystal display device will be described with reference to graphs.

Figure 2A:
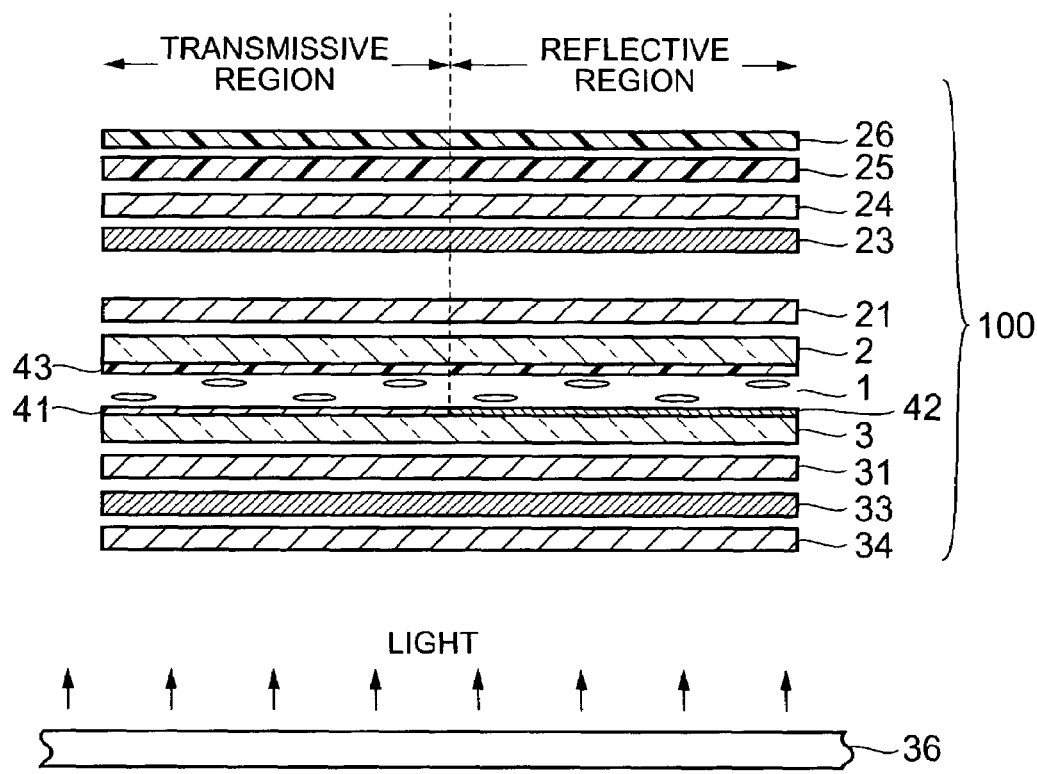
FIG. 2A illustrates a cross sectional view of one pixel of the semi-transmissive liquid crystal display device configured to remove a light scattering layer from the device shown in FIG. 1A.
Figure 2B:
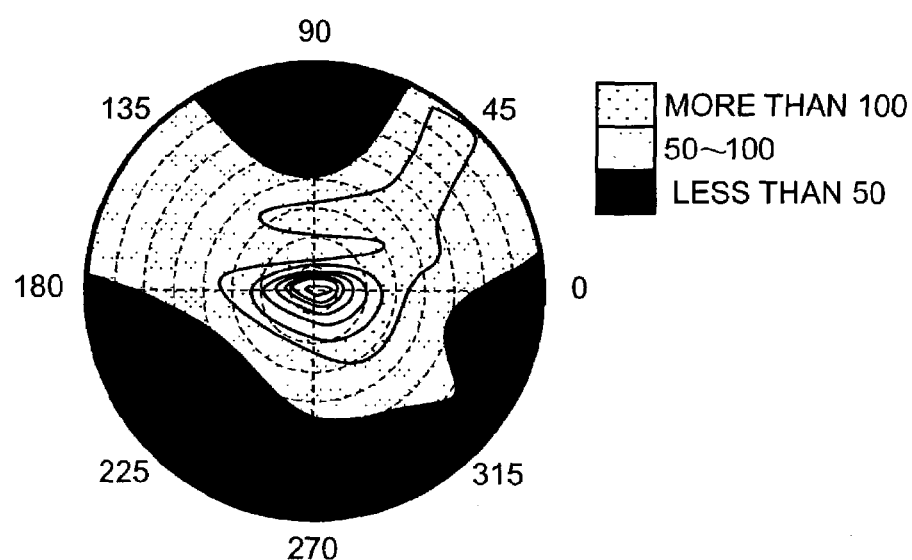
FIG. 2B illustrates a cone coordinate graph indicating contrast characteristics of the device when a viewpoint is changed with respect to the display screen of the device shown in FIG. 1A.
Figure 3A:
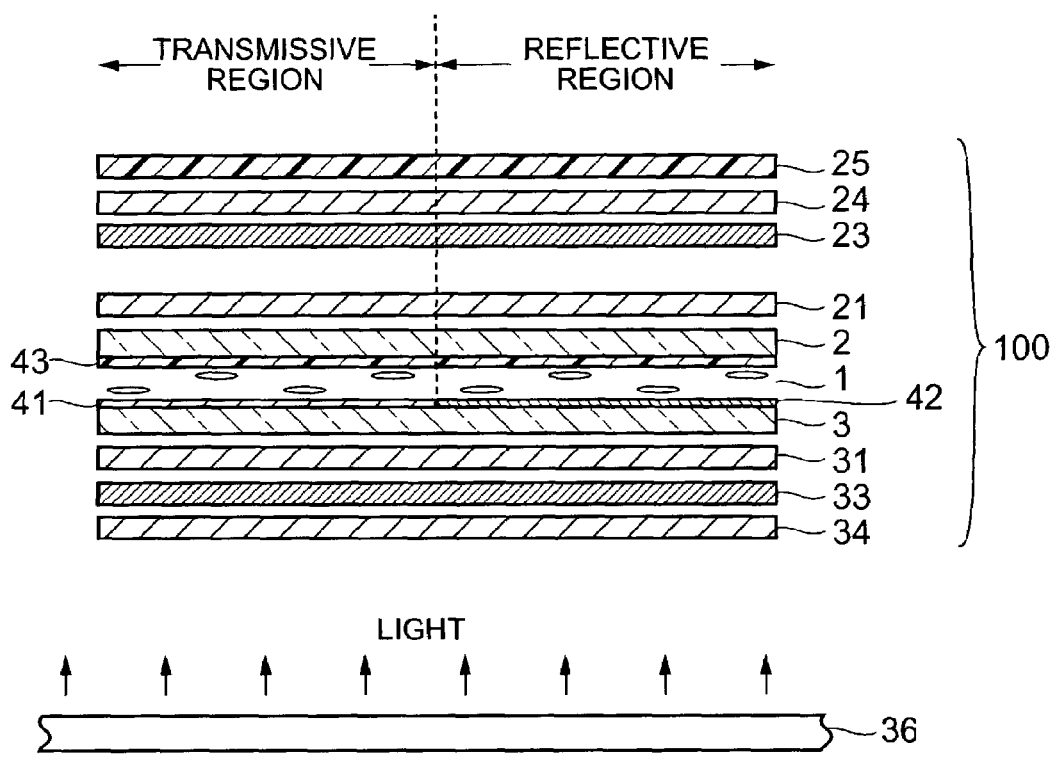
FIG. 3A illustrates a schematic cross sectional view of one pixel of the semi-transmissive liquid crystal display device configured to remove a diffraction film and a light scattering layer from the device shown in FIG. 1A.
Figure 3B:
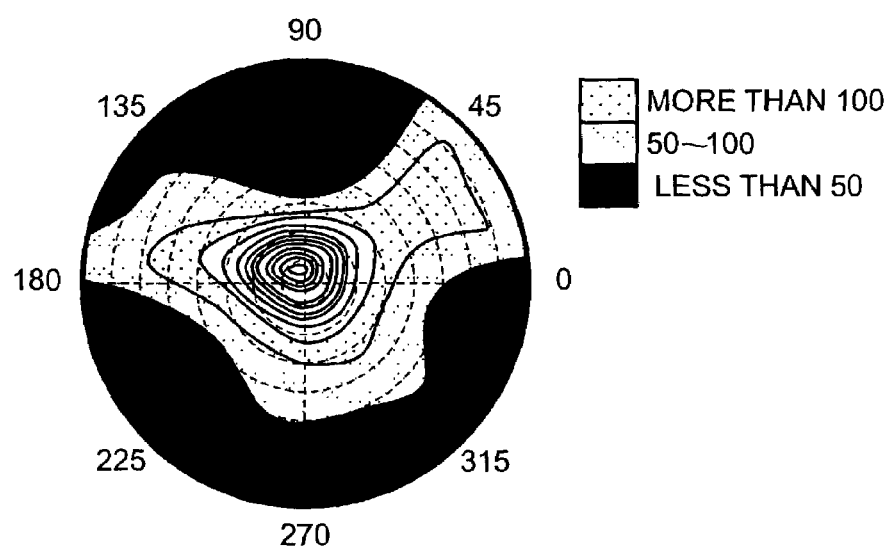
FIG. 3B illustrates a cone coordinate graph indicating the contrast characteristics of the device shown in FIG. 3A.

FIG. 2A illustrates a cross sectional view of one pixel of the semi-transmissive liquid crystal display device provided with the diffraction film of commercially available "LUMISTY" (registered trade mark; manufactured by Sumitomo Chemical Co., Ltd.) as a Bragg grating while the light scattering layer 22 is removed therefrom, and FIG. 2B illustrates a cone coordinate graph indicating the viewing angle characteristics of the device when a viewpoint is changed with respect to the display screen of the device. FIG. 3A illustrates the schematic cross sectional view of one pixel of the semi-transmissive liquid crystal display device configured to remove both the diffraction film 26 and the light scattering layer 22 from the device shown in FIG. 1A, and FIG. 3B illustrates a cone coordinate graph indicating the viewing angle characteristics of the device. In this case, a view point from a position normal to the display surface corresponds to the center of a circle and is represented by (0°, 0°). Contour lines drawn concentrically ranging from 0° to 90° represent an angle inclined in relation to the normal of the display surface, and the radius drawn counterclockwise ranging from 0°, which is assumed to correspond to the right direction on the paper, to 360° represents the direction of the viewpoint.

Figure 4:
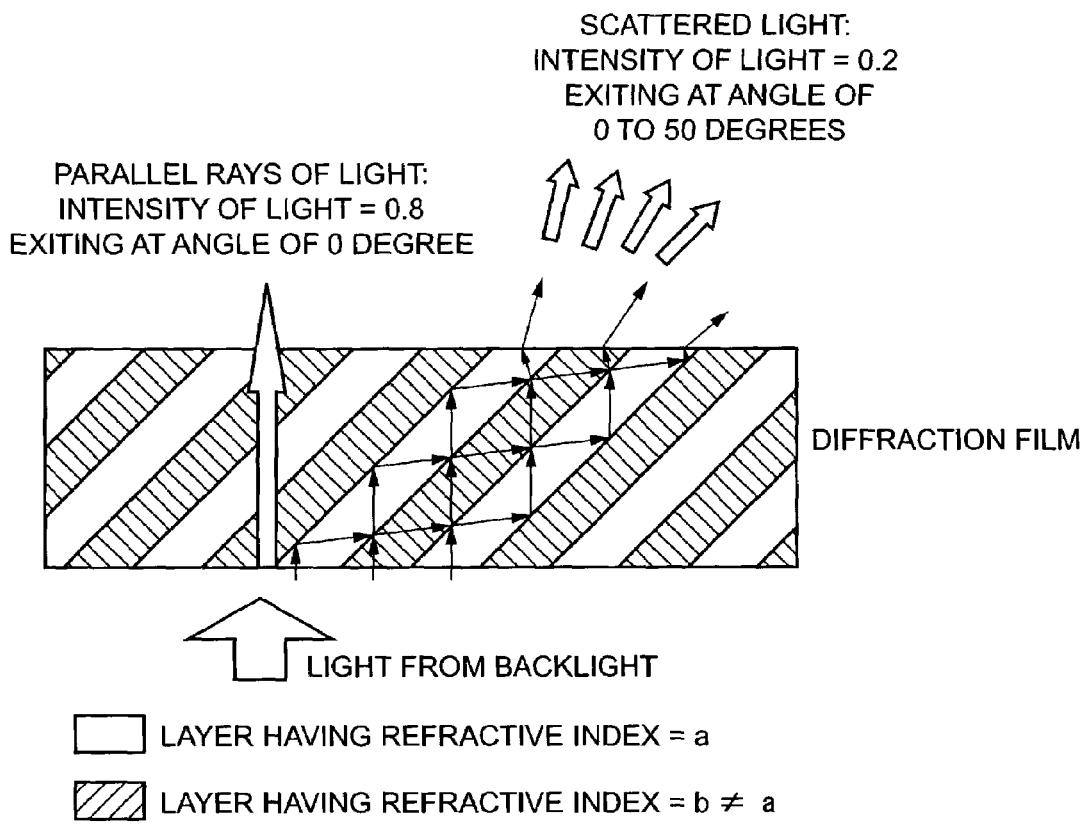
FIG. 4 schematically illustrates the relationship between transmissive light and scattered light when parallel rays transmit through a diffraction film of the diffraction film.

How the diffraction film 26 operates will be briefly explained below with reference to FIG. 4. The diffraction film 26 consists of multiple layers containing a plurality of laminated films comprised of two transparent and inclined layers having refractive indexes different from each other and disposed at a specific angle with respect to the direction of film thickness of the diffraction film 26. When parallel rays of light are vertically incident on the diffraction film, a major part of the parallel rays transmits through the diffraction film and the remainder (about 20% of the rays) is reflected by the boundary between the two layers having refractive indexes different from each other. The reflected light travels within the corresponding layer while being reflected multiple times by the boundaries between the layer in problem and the other layer adjacent thereto, and finally, exits from the diffraction film at a specific angle (for example, ranging from 0 to 50 degrees) in relation to the normal of the film. That is, the diffraction film operates such that it allows light incident thereon to mainly exit therefrom vertically (the component of light corresponds to light indicated by (0°, 0°) of FIGS. 2B, 3B) while partly exiting at a specific angle in relation to the normal of the film, i. e., in a direction towards a viewer who views from upper side of the display screen of the device, thereby serving as a Bragg grating. Such operation can be realized by disposing the inclined layers of the laminated films of the diffraction film 26 so as to extend in right/left directions (horizontal direction) on the display screen of the panel.

The cone coordinate graph shown in FIG. 2B teaches that the device having the diffraction film 26 therein has the area, which is enclosed by the line indicating contrast of 100 or higher in the cone coordinate, larger than that obtained by measuring the viewing-angle characteristics of the device having no diffraction film particularly at 90 degree direction (corresponding to view from an upper side of the device) in the cone coordinate. This indicates that the device having the diffraction film 26 therein has viewing angle characteristics improved in comparison with those observed in the device having no diffraction film. The reason is as follows. That is, although the semi-transmissive liquid crystal display device generally has contrast characteristics in directions around (0°, 0°) in the cone coordinate significantly improved, the device has contrast characteristics deteriorated in directions other than the aforementioned directions. In order to improve the contrast characteristics of the device in the aforementioned directions, especially in directions towards a viewer who views from upper side of the display screen of the device, light incident on the device is partially made to exit therefrom in the directions corresponding to view from an upper side of the display screen of the device.

Figure 5:
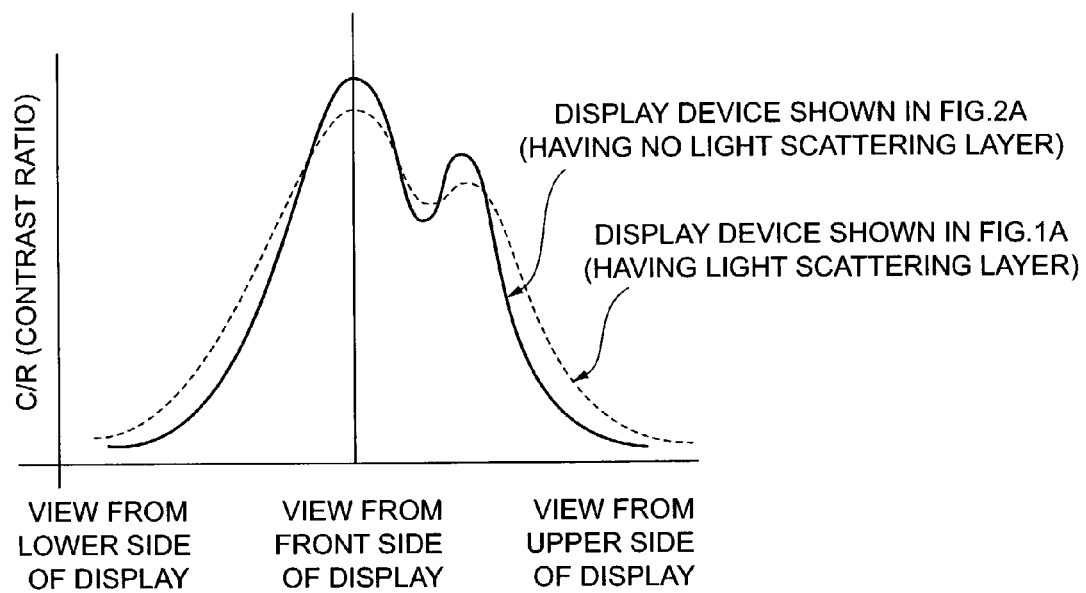
FIG. 5 illustrates the viewing angle characteristics of the semi-transmissive liquid crystal display devices with and without the light scattering layer shown in FIG. 1, respectively.

FIG. 5 illustrates the viewing angle characteristics (indicated by a dashed line) of the semi-transmissive liquid crystal display device containing both the diffraction film and the light scattering layer while comparing with those (indicated by a solid line) of the device from which only the light scattering layer is removed. In this case, the viewing angle characteristics of the device are shown as a contrast profile that is obtained by cutting the cone coordinate graph corresponding to the viewing angle characteristics along a line connecting the points of 90° and 270° in the cone coordinate graph using a plane perpendicular to the bottom surface of the cone. The graph indicates that a second peak, observed at around 45 degree viewing angle when viewing the device from an upper side of display, of the contrast curve versus viewing-angle increases its height. In practice, when a semi-transmissive liquid crystal display device is prepared using the above-described configuration and the device is viewed by eyes, the second peak can clearly be identified, making a viewer feel that the viewing angle characteristics of the device is significantly degraded. In contrast, when the device has the light scattering layer 22 disposed nearer the liquid crystal layer than the diffraction film, the second peak apparently reduces its height. In practice, when a semi-transmissive liquid crystal display device is prepared using the above-described configuration and the device is viewed by actual eyes, the second peak substantially disappears.

This means that the device including the CF substrate that has both the diffraction film and the light scattering layer provided thereon has viewing angle characteristics improved significantly in comparison with the device including the CF substrate that has only the diffraction film out of the above-described two components provided thereon.

The light scattering layer 22 may be a layer having high transmittance of light and causing significantly less backward scattering than forward scattering of light incident thereon. Furthermore, although the light scattering layer 22 can be realized by employing a single plate, it may also be used as an adhesive layer to bond the ¼λ plate 21 and the ½λ plate 23 together. In more detail, the adhesive layer may be constructed such that fine transparent beads are dispersed into the adhesive layer as a matrix consisting of an acrylic adhesive or the like. In order to cause significantly less backward scattering than forward scattering of light incident on the light scattering layer, the material (e. g., a plastic material) having refractive index not significantly different from that of the matrix is preferably selected to constitute the beads. It is at least required to prevent the light scattering layer from having transmittance of light less than 80% and it is more preferable to make the light scattering layer have transmittance of light not less than 99.9%. For example, the acrylic adhesive (refractive index=1.52) is made to contain silicone beads (refractive index=1.46) or fluorinated plastic beads (refractive index=1.3) having a particle diameter of 1 to 10 micrometers, so that the light scattering layer 22 has transmittance of light not less than 80%. Detailed example of light scattering layer is disclosed in, for example, JP 2001-133606 A.

Figure 6A:
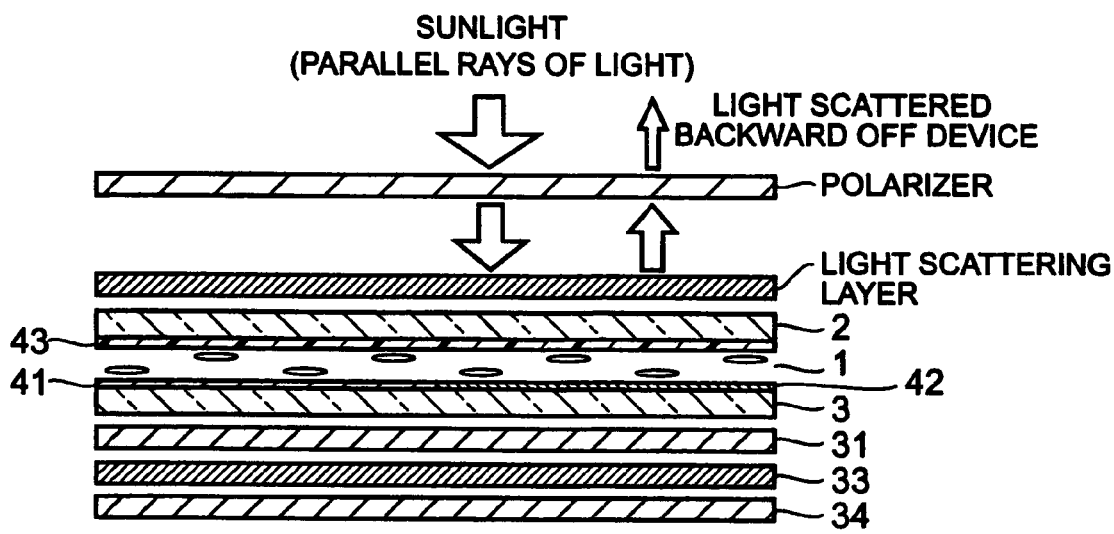
FIG. 6A illustrates a cross sectional view of one pixel of the semi-transmissive liquid crystal display device for explaining the effect of the position of the light scattering layer of the present invention.
Figure 6B:
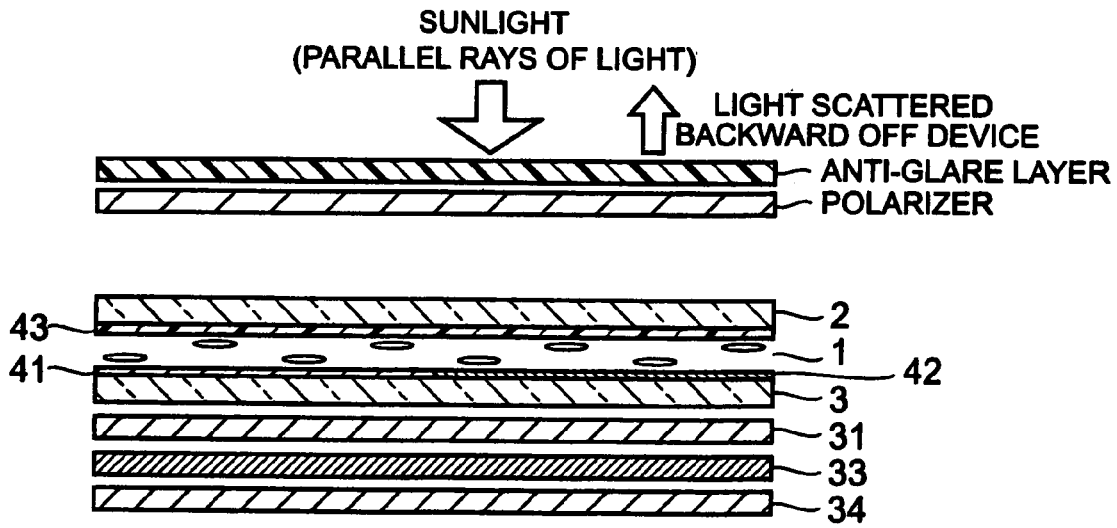
FIG. 6B illustrates a cross sectional view of one pixel of a conventional semi-transmissive liquid crystal display device.

How the positional relationship between the light scattering layer and the polarizer affects backward scattering of light will be described in detail with reference to FIGS. 6A and 6B. FIG. 6A illustrates a cross sectional view of one pixel of the semi-transmissive liquid crystal display device configured to dispose the light scattering layer between the polarizer and the liquid crystal layer, which configuration is employed in the embodiment of the present invention. FIG. 6B illustrates a cross sectional view of one pixel of the semi-transmissive liquid crystal display device configured to dispose an anti-glare (AG) layer on the outer surface of the polarizer, which configuration is employed in the conventional technique. With respect to the above-described configurations of the device, the degree to which light scattered backward off the device is suppressed can be estimated under the following conditions as follows.

(1) Essential Assumptions

Sunlight: $2 \times 10^9$ (unit: $cd/cm^2$)

Ratio of the amount of light scattered backward off the AG layer to the total amount of light incident thereon: 1.0%

Ratio of the amount of light scattered backward off the light scattering layer to the total amount of light incident thereon (hereinafter, referred to as backward scattering ratio associated with light scattering layer): 0.1%

Transmittance of the polarizer: 49%

Note that light except for light related to the phenomenon where light incident on the corresponding layer is scattered backward off the layer is excluded from the figures and the calculation for simplicity (e.g., light scattered forward off the corresponding layer or light reflected by a reflector)

(2) Estimation Values Obtained by Calculating the Intensity of Light Scattered (Unit: $cd/cm^2$)

In the case of the embodiment (the optical layer for the CF-substrate consists of: polarizer/light scattering layer/liquid crystal layer), sunlight incident on the device passes through the polarizer to reach the light scattering layer and then, is partially scattered backward off the layer to again pass through the polarizer, thereby exiting to the outside. Then, the calculation is carried out under the aforementioned conditions.

(Sunlight: $2 \times 10^9$) × (Transmittance of the polarizer: 49%)$^2$ ×

(Backward scattering ratio associated with light scattering layer: 0.1%) = $0.48 \times 10^6$ In the case of an example for comparison (the optical layer for the CF-substrate consists of: AG layer/polarizer/liquid crystal layer), the outer surface (positioned opposite the liquid crystal layer) of the polarizer is rubbed to have a roughened surface as the AG layer. Sunlight incident on the device is partially scattered by the AG layer to exit to the outside.

(Sunlight: $2 \times 10^9$)×(Backward scattering ratio associated with light scattering layer:0.1%)=$20 \times 10^6$ As can be seen from the calculation, the device configured to dispose the light scattering layer between the polarizer and the liquid crystal layer allows the degree to which light incident on the device is scattered backward off the device to decrease more significantly than that observed in the example for comparison.

Although the light scattering layer 22 is disposed between the ¼λ plate 21 and the ½λ plate 23, the light scattering layer 22 is not limited to the above-described positional relationship and may be disposed at any position on the CF substrate to produce the same beneficial advantages as those obtained by using the aforementioned device, as long as it is nearer the liquid crystal layer than the polarizer 24.

As described above, the semi-transmissive liquid crystal display device of the present invention is so configured that the diffraction film is provided on the CF substrate on a side thereof, on which the display screen is located, to improve the viewing angle characteristics of the device. In addition, the light scattering layer is provided on the CF substrate and located nearer the liquid crystal layer than the diffraction film to improve the viewing angle characteristics of the device to a larger extent in comparison with the case where the device employs only the diffraction film. Particularly, disposing the light scattering layer on the CF substrate nearer the liquid crystal layer than the polarizer makes it possible to significantly reduce the degree to which sunlight incident on the device is scattered backward off the device.

What is claimed is:

1. A semi-transmissive liquid crystal display device, comprising:
   a liquid crystal panel including a plurality of pixels, each of said pixels being divided into a transmissive region and a reflective region;
   a backlight member disposed behind said liquid crystal panel;
   a diffraction film disposed on a front side of said liquid crystal panel so as to diffract a transmissive light from said backlight member traveling through said transmissive region; and
   a scattering layer disposed between said diffraction film and said liquid crystal panel so as to scatter an external light entering said reflective region through said diffraction film,
   wherein said diffraction provides a second peak in a viewing angle characteristic curve for said device at approximately 45 degrees, and said scattering layer reduces a height of said secondary peak.

2. The semi-transmissive liquid crystal display device according to claim 1, further comprising a polarizer disposed between said diffraction film and said scattering layer.

3. The semi-transmissive liquid crystal display device according to claim 1, wherein said diffraction film serves as a Bragg grating.

4. The semi-transmissive liquid crystal display device according to claim 1, wherein said diffraction film diffracts said light from said backlight member traveling upward toward an outer region of said liquid crystal device.

5. The semi-transmissive liquid crystal display device according to claim 4, wherein said diffraction film is formed such that two layers having refractive indexes different from each other are alternately laminated at an angle inclined in relation to a horizontal direction such that said two layers are extended in left/right directions with respect to a display plane of said liquid crystal panel.

6. The semi-transmissive liquid crystal display device according to claim 1, wherein said light scattering layer is formed by dispersing fine transparent particles selected from the group consisting of a plurality of fine circular particles and a plurality of fine polyhedral particles into a transparent resin as a matrix.

7. The semi-transmissive liquid crystal display device according to claim 1, wherein said scattering layer allows said external light to transmit therethrough exhibiting a transmittance not less than 80%.

8. The semi-transmissive liquid crystal display device according to claim 1, wherein said liquid crystal panel comprises a liquid crystal layer sandwiched between a first substrate provided with a color layer and a second substrate provided with a plurality of pixel electrodes, and wherein said liquid crystal panel is constructed such that said second substrate is located on a side of said backlight member and each of said pixel electrodes comprises a transparent electrode for said transimissive region and a reflective electrode for said reflective region.

9. The semi-transmissive liquid crystal display device according to claim 8, further comprising a polarizer disposed between said diffraction film and said scattering layer wherein said diffraction film diffracts said light from said backlight member travelling upward toward an outer region of said liquid crystal device.

10. The semi-transmissive liquid crystal display device according to claim 8, wherein said first substrate has a ¼λ plate 21, a light scattering layer, a ½λ plate, said polarizer, a ¼λ plate and said diffraction film in order provided on a surface thereof opposite said liquid crystal layer, and wherein said second substrate has a ¼λ plate, a ½λ plate and a polarizer in order provided on a surface thereof opposite said liquid crystal layer.

* * * * *